(12) United States Patent
Kushida et al.

(10) Patent No.: US 9,309,387 B2
(45) Date of Patent: Apr. 12, 2016

(54) RUBBER COMPOSITION FOR TIRES AND PNEUMATIC TIRE

(75) Inventors: Naoki Kushida, Kanagawa (JP); Satoshi Mihara, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 13/822,039

(22) PCT Filed: Sep. 2, 2011

(86) PCT No.: PCT/JP2011/070036
§ 371 (c)(1),
(2), (4) Date: Mar. 11, 2013

(87) PCT Pub. No.: WO2012/035998
PCT Pub. Date: Mar. 22, 2012

(65) Prior Publication Data
US 2013/0172443 A1 Jul. 4, 2013

(30) Foreign Application Priority Data
Sep. 13, 2010 (JP) .................................. 2010-204691

(51) Int. Cl.
*C08K 3/36* (2006.01)
*C08L 9/06* (2006.01)
(Continued)

(52) U.S. Cl.
CPC ... *C08L 9/06* (2013.01); *B60C 1/00* (2013.01); *C08K 3/36* (2013.01); *C08K 5/548* (2013.01); *C08K 5/5419* (2013.01)

(58) Field of Classification Search
USPC ........................................................ 523/156
See application file for complete search history.

(56) References Cited

U.S. PATENT DOCUMENTS 3,350,345 A 10/1967 Vanderbilt et al.
5,750,610 A 5/1998 Burns et al.
(Continued)

FOREIGN PATENT DOCUMENTS

AU 737043 B2 * 11/1998
DE 1 467 440 A1 3/1969
(Continued)

OTHER PUBLICATIONS

Machine Translation of JP H10-182885.*
(Continued)

*Primary Examiner* — Nicole M Buie-Hatcher
*Assistant Examiner* — Chelsea M Christensen
(74) *Attorney, Agent, or Firm* — Carrier Blackman & Associates, P.C.; Joseph P. Carrier; Anne G. Sabourin

(57) ABSTRACT

A rubber composition for tires contains a diene rubber, silica, a sulfur-containing silane coupling agent and a triethoxysilane containing an alkyl group having a prescribed number of carbon atoms, wherein 50 mass % or more of the aforementioned diene rubber is a styrene-butadiene copolymer rubber, the aforementioned sulfur-containing silane coupling agent has a mercapto group, the content of the aforementioned silica is from 5 to 150 parts by mass per 100 parts by mass of the aforementioned diene rubber, the content of the aforementioned sulfur-containing silane coupling agent is from 3 to 15 mass % relative to the content of the aforementioned silica, and the content of the aforementioned alkyltriethoxysilane is from 0.1 to 20 mass % relative to the content of the aforementioned silica.

9 Claims, 1 Drawing Sheet

(51) Int. Cl.
*B60C 1/00* (2006.01)
*C08K 5/5419* (2006.01)
*C08K 5/548* (2006.01)

(56) References Cited

U.S. PATENT DOCUMENTS 6,369,151 B1 * 4/2002 Mizuno et al. ............... 524/492
6,573,324 B1 * 6/2003 Cohen et al. ................. 524/492

FOREIGN PATENT DOCUMENTS

| DE | 698 23 173 T2 | 11/2004 | |
|---|---|---|---|
| DE | 10 2004 039 545 A1 | 2/2006 | |
| DE | 601 30 393 T2 | 6/2008 | |
| EP | 0502728 A1 * | 9/1992 | ............... C08L 9/06 |
| EP | 1 626 062 A1 | 2/2006 | |
| GB | 1310379 | 3/1973 | |
| JP | 10-182885 A | 7/1998 | |
| WO | 02/31034 A2 | 4/2002 | |

OTHER PUBLICATIONS

Partial Human Translation of JP H10 182885, Table II, 1998.*
Office Action issued in corresponding German Patent No. 112011103060 on Dec. 6, 2013.

* cited by examiner

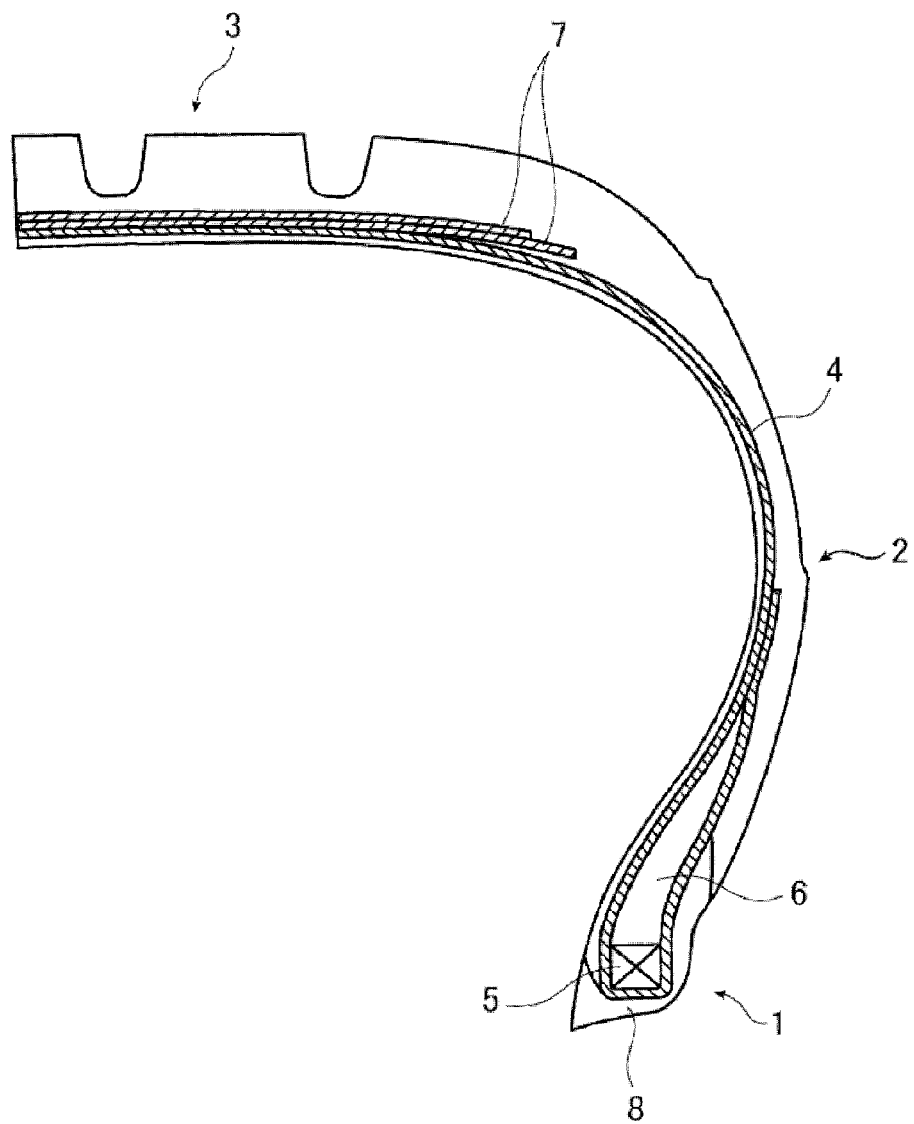

RUBBER COMPOSITION FOR TIRES AND PNEUMATIC TIRE

TECHNICAL FIELD

The present invention relates to a rubber composition for tires, and a pneumatic tire.

BACKGROUND OF THE INVENTION

The use of silica-containing rubber compositions is known as a means for improving the wet performance and reducing the rolling resistance of tires, and rubber compositions that contain a silane coupling agent in addition to silica in order to further improve performance are also known.

For example, in Patent Document 1, the applicant of the present application proposes "a silica-containing rubber composition that contains an alkoxysilane (I) represented by formula (I) and a sulfur-containing silane coupling agent.

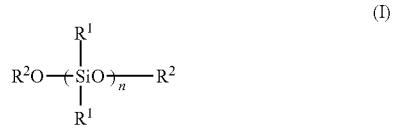

(In the formula, $R^1$ is a methyl, vinyl or phenyl group, $R^2$ is a hydrocarbon group or ether linkage-containing hydrocarbon group having 1 to 6 carbon atoms, and n is 1 to 6)" (see claim 1).

PRIOR ART DOCUMENTS

Patent Documents

Patent Document 1: Japanese Unexamined Patent Application Publication No. H10-182885A

SUMMARY OF THE INVENTION

Problem to be Solved by the Invention

However, as a result of further research into the rubber composition disclosed in Patent Document 1, it became clear to the inventor of the present invention that it might not be possible to adequately achieve a wet performance and rolling resistance improvement effect for a tire due to aggregation of silica or an increase in viscosity of the unvulcanized rubber composition depending on the types or combinations of the diene rubber, silica and silane coupling agent blended in the rubber composition.

As a result, an object of the present invention is to provide a rubber composition for tires, which can suppress aggregation of silica or an increase in viscosity and which can produce a tire having excellent wet performance and rolling resistance, and a pneumatic tire using the same.

Means to Solve the Problem

As a result of diligent research into solving the above-mentioned problems, the inventor of the present invention found that it was possible to suppress aggregation of silica or an increase in viscosity and produce a tire which has excellent wet performance and rolling resistance by blending a silane coupling agent having a mercapto group and a specific alkyltriethoxysilane with a predetermined diene rubber and silica, and completed the present invention.

Specifically, the present invention provides the following (1) to (4).

(1) A rubber composition for tires, which contains a diene rubber, silica, a sulfur-containing silane coupling agent and an alkyltriethoxysilane represented by formula (I) below, wherein 50 mass % or more of the above-mentioned diene rubber is a styrene-butadiene copolymer rubber, the above-mentioned sulfur-containing silane coupling agent has a mercapto group, the content of the above-mentioned silica is from 5 to 150 parts by mass per 100 parts by mass of the above-mentioned diene rubber, the content of the above-mentioned sulfur-containing silane coupling agent is from 3 to 15 mass % relative to the content of the above-mentioned silica, and the content of the above-mentioned alkyltriethoxysilane is from 0.1 to 20 mass % relative to the content of the above-mentioned silica.

(In the formula, $R^1$ is an alkyl group having 7 to 20 carbon atoms)

(2) The rubber composition for tires described in (1) above, wherein the CTAB adsorption specific surface area of the above-mentioned silica is greater than 160 m$^2$/g.

(3) The rubber composition for tires described in (1) or (2) above, wherein the weight-average molecular weight of the above-mentioned styrene-butadiene rubber is from 900,000 to 2,000,000.

(4) A pneumatic tire that uses the rubber composition described in any one of (1) to (3) above.

Effect of the Invention

As explained below, the present invention can provide a rubber composition for tires which can suppress aggregation of silica or an increase in viscosity and which can produce a tire having excellent wet performance and rolling resistance, and a pneumatic tire using the same.

BRIEF DESCRIPTION OF THE DRAWING

FIG. 1 is a partial cross-sectional schematic view of a tire that represents one embodiment of the pneumatic tire of the present invention.

BEST MODE FOR CARRYING OUT THE INVENTION

Rubber Composition for Tires

The rubber composition for tires of the present invention (hereinafter also referred to simply as "the rubber composition of the present invention") is a rubber composition for tires which contains a diene rubber, silica, a sulfur-containing silane coupling agent and an alkyltriethoxysilane represented by formula (I) above, wherein 50 mass % or more of the above-mentioned diene rubber is a styrene-butadiene copolymer rubber, the above-mentioned sulfur-containing silane coupling agent has a mercapto group, the content of the above-mentioned silica is from 5 to 150 parts by mass per 100 parts by mass of the above-mentioned diene rubber, the content of the above-mentioned sulfur-containing silane coupling agent is from 3 to 15 mass % relative to the content of the above-mentioned silica, and the content of the above-mentioned alkyltriethoxysilane is from 0.1 to 20 mass % relative to the content of the above-mentioned silica.

The components contained in the rubber composition of the present invention will now be explained in detail.

<Diene Rubber>

50 mass % or more of the diene rubber contained in the rubber composition of the present invention is a styrene-butadiene copolymer rubber (SBR).

Here, a terminal of the above-mentioned SBR may be modified by a hydroxy group, a polyorganosiloxane group, a carbonyl group, an amino group and the like.

In addition, the weight-average molecular weight of the above-mentioned SBR is not particularly limited, but is preferably from 900,000 to 2,000,000, and more preferably from 1,000,000 to 1,800,000, in order to increase the viscosity increase suppression effect.

Furthermore, the content (proportion) of the above-mentioned SBR is preferably from 50 to 90 mass %, and more preferably from 60 to 80 mass %, of the above-mentioned diene rubber in order to be able to produce a tire having superior wet performance and rolling resistance.

In the present invention, the above-mentioned SBR preferably contains from 30 to 50 mass % of an aromatic vinyl (hereinafter referred to as the "styrene quantity") and has a vinyl bond content (hereinafter referred to as the "butadiene quantity") in the conjugated diene of from 30 to 65 mass % in order to be able to produce a tire having superior wet performance and rolling resistance.

In cases where a diene rubber other than the above-mentioned SBR is contained in the present invention, this diene rubber is not particularly limited as long as the diene rubber has a double bond in the backbone. Specific examples thereof include natural rubbers (NR), isoprene rubbers (IR), butadiene rubbers (BR), chloroprene rubbers (CR), acrylonitrile-butadiene rubbers (NBR), ethylene-propylene-diene copolymer rubbers (EPDM), styrene-isoprene rubbers, isoprene-butadiene rubbers, nitrile rubbers and hydrogenated nitrile rubbers, and it is possible to use one or two or more types of these diene rubbers.

Of these, the use of BR is preferred in order to be able to produce a tire having good wear resistance and superior rolling resistance.

<Silica>

The silica contained in the rubber composition of the present invention is not particularly limited, and can be any conventional, publicly known silica that is blended in rubber compositions used in tires and the like.

Specifically, the above-mentioned silica can be, for example, fumed silica, calcined silica, precipitated silica, pulverized silica, molten silica or colloidal silica, and it is possible to use one or two or more of these silica types.

In the present invention, the CTAB adsorption specific surface area of the above-mentioned silica is preferably greater than 160 m²/g, and more preferably from 170 to 230 m²/g in order to increase the silica aggregation suppression effect.

Here, the CTAB adsorption specific surface area is measured according to the CTAB adsorption method disclosed in JIS (Japanese Industrial Standards) K 6217-3:2001.

In the present invention, the content of the above-mentioned silica is from 5 to 150 parts by mass per 100 parts by mass of the above-mentioned diene rubber, and is more preferably is from 40 to 100 parts by mass per 100 parts by mass of the above-mentioned diene rubber in order to impart the obtained tire with superior wet performance and rolling resistance and improved wear resistance and strength.

<Sulfur-containing Silane Coupling Agent>

The sulfur-containing silane coupling agent contained in the rubber composition of the present invention is not particularly limited as long as the silane coupling agent contains a mercapto group, and can be any conventional, publicly known silane coupling agent that is blended in rubber compositions used in tires and the like.

Specifically, the above-mentioned sulfur-containing silane coupling agent can be, for example, 3-mercaptopropyltrimethoxysilane, 3-mercaptopropyltriethoxysilane or trimethoxysilylpropyl-mercaptobenzothiazole tetrasulfide, and it is possible to use one or two or more of these silane coupling agents.

In the present invention, the content of the above-mentioned sulfur-containing silane coupling agent is from 3 to 15 mass % relative to the content of the above-mentioned silica, and is more preferably from 5 to 10 mass % relative to the content of the above-mentioned silica in order to improve physical properties, such as tensile strength and elongation breakage following vulcanization, of the rubber composition of the present invention.

<Alkyltriethoxysilane>

The alkyltriethoxysilane contained in the rubber composition of the present invention is a silane compound represented by formula (I) below.

(I)

(In the formula, $R^1$ is an alkyl group having 7 to 20 carbon atoms)

Specifically, the alkyl group having 7 to 20 carbon atoms of $R^1$ may be, for example, a heptyl group, an octyl group, a nonyl group, a decyl group, an undecyl group or a dodecyl group.

Of these, an alkyl group having 8 to 10 carbon atoms is preferred and an octyl group or a nonyl group is more preferred in order to achieve compatibility with the diene rubber.

By using a rubber composition that contains the above-mentioned alkyltriethoxysilane in the present invention, it is possible to suppress aggregation of silica or an increase in viscosity and produce a tire having excellent wet performance and rolling resistance.

A detailed reason for this is not clear, but it is thought that the above-mentioned alkyltriethoxysilane facilitates a reaction (silanization) between the above-mentioned silica and the above-mentioned silane coupling agent, improves the dispersibility of the above-mentioned silica and mitigates a reaction between the above-mentioned diene rubber (especially an SBR) and the above-mentioned silane coupling agent.

In addition, the content of the above-mentioned alkyltriethoxysilane in the present invention is from 0.1 to 20 mass % relative to the content of the above-mentioned silica, and is preferably from 0.5 to 10 mass %, and more preferably from 1 to 6 mass %, relative to the content of the above-mentioned silica in order to achieve a balance between the vulcanization rate of the rubber composition of the present invention and the hardness and processability of the rubber composition.

In addition to the components mentioned above, a variety of additives that are commonly used in rubber compositions for tires, such as fillers other than silica (for example, carbon black and the like), vulcanizing or crosslinking agents, vulcanizing or crosslinking accelerators, zinc oxide, oils, anti-aging agents or plasticizers, may be blended in the rubber composition of the present invention. Compounded amounts of these additives may be any conventional amount, so long as the object of the present invention is not hindered.

The method for producing the rubber composition of the present invention is not particularly limited and may be, for example, a method in which the above-mentioned components are kneaded using a publicly known method and apparatus (for example, a Banbury mixer, a kneader, a roll and the like).

In addition, the rubber composition of the present invention can be vulcanized or crosslinked under conventional, publicly known vulcanizing or crosslinking conditions.

Tire

The pneumatic tire of the present invention (hereinafter also referred to simply as "the tire of the present invention") is a pneumatic tire that uses the above-mentioned rubber composition of the present invention.

FIG. 1 is a partial cross-sectional schematic view of a tire that represents one embodiment of the pneumatic tire of the present invention, but the tire of the present invention is not limited to the mode illustrated in FIG. 1.

In FIG. 1, 1 denotes a bead portion, 2 denotes a side wall portion and 3 denotes a tire tread portion.

In addition, a carcass layer 4, in which a fiber cord is embedded, is mounted between a left-right pair of bead portions 1, and ends of the carcass layer 4 are wound by being folded around bead cores 5 and a bead filler 6 from an inner side to an outer side of the tire.

In the tire tread portion 3, a belt layer 7 is provided along the entire periphery of the tire on the outer side of the carcass layer 4.

Additionally, rim cushions 8 are provided in parts of the bead portions 1 that are in contact with a rim.

The tire of the present invention can be produced by vulcanizing or crosslinking at a temperature that depends on the types and blending quantities of the diene rubber, vulcanizing agent or crosslinking agent and vulcanization accelerator or crosslinking accelerator contained in the rubber composition of the present invention so as to form a tread portion, side wall portion and the like.

In the present invention, it is preferable to form a tire tread portion, in which the blending quantity of silica is higher than in the other portions, from the rubber composition of the present invention in order to realize the effect of the present invention, that is, suppressing aggregation of silica or an increase in viscosity and achieving excellent wet performance and rolling resistance.

EXAMPLES

The present invention is described below in detail using working examples. But it is in no way limited to these examples.

Working Examples 1 to 6 and Comparative Examples 1 to 9

The components shown in Table 1 below were blended at the proportions (parts by mass) shown in Table 1 below.

Specifically, a master batch was obtained by first kneading the components shown in Table 1 below, except for the sulfur and the vulcanization accelerator, for 3 to 5 minutes in a 1.5 L closed type mixer, and then discharging the kneaded product when the temperature reached 150±5° C.

Next, a rubber composition was obtained by kneading the sulfur and the vulcanization accelerator with the obtained master batch using an open roll.

<Mooney Viscosity>

The Mooney viscosity of the prepared (unvulcanized) rubber composition was measured in accordance with JIS (Japanese Industrial Standards) K 6300-1:2001 using an L-shaped rotor, a pre-heating time of 1 minute, a rotor rotation time of 4 minutes and a test temperature of 100° C.

The measured values were recorded in Table 1 below as an index, with the value for Comparative Example 1 being 100. A smaller index means a lower viscosity and good processability.

<Payne Effect (Indicator of Silica Dispersibility)>

Using a strain-shearing stress measurement device (RPA 2000 manufactured by Alpha Technologies), the prepared (unvulcanized) rubber composition was vulcanized for 20 minutes at 160° C., the shearing stress (G') at a strain of 0.28% and the shearing stress (G') at a strain of 30.0% were measured, and the difference (G'0.28 (MPa)–G'30.0 (MPa)) was calculated as the Payne effect.

The calculated results were recorded in Table 1 below as an index, with the value for Comparative Example 1 being 100. A smaller index means a lower Payne effect and superior silica dispersibility.

<Hardness>

A vulcanized rubber sheet was prepared by vulcanizing the prepared (unvulcanized) rubber composition for 30 minutes at 160° C. in a mold (15 cm×15 cm×0.2 cm).

The hardness (Hs, 20° C.) of the prepared vulcanized rubber sheet was evaluated by measuring in accordance with JIS (Japanese Industrial Standards) K-6253:2006.

The measured values were recorded in Table 1 below as an index, with the value for Comparative Example 1 being 100. A higher index means a higher and better hardness.

<Tan δ (0° C.) (Indicator of Wet Performance)>

Using a viscoelastic spectrometer (manufactured by Toyo Seiki Manufacturing Co.), the tan δ value of the vulcanized rubber sheet prepared for the hardness measurement was measured in accordance with JIS (Japanese Industrial Standards) K 6394:2007 at an initial distortion of 10%, an amplitude of ±2%, a frequency of 20 Hz and a temperature of 0° C.

The obtained results were recorded in Table 1 as an index, with the value for Comparative Example 1 being 100. A larger index value indicates a larger tan δ and superior wet grip performance.

<Tan δ (60° C.) (Indicator of Rolling Resistance)>

Using a viscoelastic spectrometer (manufactured by Toyo Seiki Manufacturing Co.), the tan δ value of the vulcanized rubber sheet prepared for the hardness measurement was measured in accordance with JIS (Japanese Industrial Standards) K 6394:2007 at an initial distortion of 10%, an amplitude of ±2%, a frequency of 20 Hz and a temperature of 60° C.

The obtained results were recorded in Table 1 as an index, with the value for Comparative Example 1 being 100. A smaller index means a lower tan δ value and superior (lower) rolling resistance.

TABLE 1

|  | Comparative Examples | | | | | |
| --- | --- | --- | --- | --- | --- | --- |
|  | 1 | 2 | 3 | 4 | 5 | 6 |
| Styrene-butadiene rubber 1 (Rubber component) | 96.3 (70) | 96.3 (70) |  | 96.3 (70) |  |  |
| Styrene-butadiene rubber 2 (Rubber component) |  |  | 96.3 (70) |  | 96.3 (70) | 96.3 (70) |
| Butadiene rubber | 30 | 30 | 30 | 30 | 30 | 30 |
| Silica 1 | 70 | 70 | 70 |  |  |  |
| Silica 2 |  |  |  | 70 | 70 | 70 |
| Silane coupling agent 1 (Quantity relative to 100 parts by mass of silica) | 7 (10) | 7 (10) | 7 (10) | 7 (10) | 7 (10) | 7 (10) |
| Silane coupling agent 2 (Quantity relative to 100 parts by mass of silica) |  |  |  |  |  |  |
| Alkylsilane 1 (Quantity relative to 100 parts by mass of silica) |  |  |  |  |  |  |
| Alkylsilane 2 (Quantity relative to 100 parts by mass of silica) |  | 2 (2.9) | 2 (2.9) |  |  | 2 (2.9) |
| Carbon black | 10 | 10 | 10 | 10 | 10 | 10 |
| Zinc oxide | 3 | 3 | 3 | 3 | 3 | 3 |
| Stearic acid | 2 | 2 | 2 | 2 | 2 | 2 |
| Antiaging agent | 3 | 3 | 3 | 3 | 3 | 3 |
| Aromatic oil | 10 | 10 | 10 | 10 | 10 | 10 |
| Sulfur | 2 | 2 | 2 | 2 | 2 | 2 |
| Vulcanization accelerator 1 | 2 | 2 | 2 | 2 | 2 | 2 |
| Vulcanization accelerator 2 | 1 | 1 | 1 | 1 | 1 | 1 |
| Mooney viscosity | 100 | 97 | 90 | 140 | 160 | 110 |
| Payne effect | 100 | 101 | 101 | 90 | 93 | 90 |
| Hardness (Hs, 20° C.) | 100 | 95 | 97 | 105 | 108 | 106 |
| tanδ (0° C.) | 100 | 100 | 100 | 105 | 105 | 104 |
| tanδ (60° C.) | 100 | 100 | 100 | 95 | 93 | 92 |

|  | Comparative Examples | | | Working Examples | | | | | |
| --- | --- | --- | --- | --- | --- | --- | --- | --- | --- |
|  | 7 | 8 | 9 | 1 | 2 | 3 | 4 | 5 | 6 |
| Styrene-butadiene rubber 1 (Rubber component) |  |  |  |  |  | 96.3 (70) |  |  |  |
| Styrene-butadiene rubber 2 (Rubber component) | 96.3 (70) | 96.3 (70) | 96.3 (70) | 96.3 (70) | 96.3 (70) |  | 96.3 (70) | 110 (80) | 96.3 (70) |
| Butadiene rubber | 30 | 30 | 30 | 30 | 30 | 30 | 30 | 20 | 30 |
| Silica 1 |  |  |  |  |  |  | 70 |  |  |
| Silica 2 | 70 | 70 | 70 | 70 | 70 | 70 |  | 70 | 80 |
| Silane coupling agent 1 (Quantity relative to 100 parts by mass of silica) | 7 (10) |  |  |  |  |  |  |  |  |
| Silane coupling agent 2 (Quantity relative to 100 parts by mass of silica) |  | 7 (10) | 7 (10) | 7 (10) | 7 (10) | 7 (10) | 7 (10) | 7 (10) | 8 (10) |
| Alkylsilane 1 (Quantity relative to 100 parts by mass of silica) | 2 (2.9) |  | 2 (2.9) |  |  |  |  |  |  |

TABLE 1-continued

| | | | | | | | | | |
|---|---|---|---|---|---|---|---|---|---|
| Alkylsilane 2 (Quantity relative to 100 parts by mass of silica) | | | | 2 (2.9) | 5 (7.1) | 2 (2.9) | 2 (2.9) | 5 (7.1) | 5.7 (7.1) |
| Carbon black | 10 | 10 | 10 | 10 | 10 | 10 | 10 | 10 | 10 |
| Zinc oxide | 3 | 3 | 3 | 3 | 3 | 3 | 3 | 3 | 3 |
| Stearic acid | 2 | 2 | 2 | 2 | 2 | 2 | 2 | 2 | 2 |
| Antiaging agent | 3 | 3 | 3 | 3 | 3 | 3 | 3 | 3 | 3 |
| Aromatic oil | 10 | 10 | 10 | 10 | 10 | 10 | 10 | 10 | 10 |
| Sulfur | 2 | 2 | 2 | 2 | 2 | 2 | 2 | 2 | 2 |
| Vulcanization accelerator 1 | 2 | 2 | 2 | 2 | 2 | 2 | 2 | 2 | 2 |
| Vulcanization accelerator 2 | 1 | 1 | 1 | 1 | 1 | 1 | 1 | 1 | 1 |
| Mooney viscosity | 120 | 115 | 105 | 90 | 80 | 97 | 85 | 83 | 87 |
| Payne effect | 96 | 85 | 93 | 85 | 75 | 80 | 92 | 79 | 81 |
| Hardness (Hs, 20° C.) | 106 | 90 | 89 | 102 | 100 | 96 | 99 | 100 | 105 |
| tanδ (0° C.) | 102 | 98 | 96 | 110 | 115 | 110 | 108 | 119 | 116 |
| tanδ (60° C.) | 100 | 84 | 84 | 85 | 75 | 75 | 90 | 80 | 89 |

The components shown in Table 1 are as follows.
Styrene-butadiene rubber 1: Nippol NS460 (oil extending quantity per 100 parts by mass of rubber component: 37.5 parts by mass (rubber content per 96.3 parts by mass: 70 parts by mass), weight-average molecular weight: 780,000, styrene quantity: 25 mass %, butadiene quantity: 63 mass %, manufactured by Zeon Corporation)
Styrene-butadiene rubber 2: E581 (oil extending quantity per 100 parts by mass of rubber component: 37.5 parts by mass (rubber content per 96.3 parts by mass: 70 parts by mass, rubber content per 110 parts by mass: 80 parts by mass), weight-average molecular weight: 1,260,000, styrene quantity: 40 mass %, butadiene quantity: 44 mass %, manufactured by Asahi Kasei Corporation)
Butadiene rubber: Nippol BR 1220 (manufactured by Zeon Corporation)
Silica 1: Zeosil 115GR (CTAB adsorption specific surface area: 125 $m^2/g$, manufactured by Rhodia)
Silica 2: Zeosil Premium 200 MP (CTAB adsorption specific surface area: 200 $m^2/g$, manufactured by Rhodia)
Silane coupling agent 1: Si 69 (Manufactured by Evonik Degussa)
Silane coupling agent 2: 3-mercaptopropyltrimethoxysilane (KBM-803, manufactured by Shin-Etsu Chemical Co., Ltd.)
Alkylsilane 1: dimethyldiethoxysilane (KBE-22, manufactured by Shin-Etsu Chemical Co., Ltd.)
Alkylsilane 2: octyltriethoxysilane (KBE-3083, manufactured by Shin-Etsu Chemical Co., Ltd.)
Carbon black: Seast 6 ($N_2SA$: 119 $m^2/g$, manufactured by Tokai Carbon Co., Ltd.)
Zinc oxide: Type 3 zinc flower (manufactured by Seido Chemical Industry Ltd.)
Stearic acid: stearic acid beads (manufactured by Nippon Oil & Fats Co., Ltd.)
Antiaging agent: N-phenyl-N'-(1,3-dimethylbutyl)-p-phenylenediamine (Santoflex 6PPD, manufactured by Flexsys)
Aroma oil: Extract 4S (manufactured by Showa Shell Sekiyu K.K.)
Sulfur: "Golden Flower" oil-treated sulfur powder (manufactured by Tsurumi Chemical Industry Co., Ltd.)
Vulcanization accelerator 1: N-cyclohexyl-2-benzothiazolyl sulfenamide (NOCCELER CZ-G, manufactured by Ouchi Shinko Chemical Industrial Co., Ltd.)
Vulcanization accelerator 2: 1,3-diphenylguanidine (Soxinol D-G, manufactured by Sumitomo Chemical Co., Ltd.)

It can be understood from the results shown in Table 1 above that in systems that contained a sulfur-containing silane coupling agent not having a mercapto group (Comparative Examples 1 to 7), those systems that did not contain the prescribed alkyltriethoxysilane and those systems that contained dimethyldiethoxysilane exhibited increased viscosity (Comparative Examples 1, 4, 5 and 7), and it can also be understood that even in systems that contained the prescribed alkyltriethoxysilane, it was not possible to suppress both silica aggregation and an increase in viscosity (Comparative Examples 2, 3 and 6).

In addition, it can be understood that even the case of systems that contained a sulfur-containing silane coupling agent having a mercapto group (Comparative Examples 8 and 9), it was not possible to adequately suppress an increase in viscosity in a system that did not contain the prescribed alkyltriethoxysilane (Comparative Example 8) or a system that contained dimethyldiethoxysilane (Comparative Example 9).

However, it can be understood that the rubber compositions of Working Examples 1 to 6, each of which contained a sulfur-containing silane coupling agent having a mercapto group and the prescribed alkyltriethoxysilane, were able to suppress silica aggregation and an increase in viscosity and produce tires having excellent wet performance and rolling resistance.

In particular, it can be understood that the rubber compositions of Working Examples 1 and 2 and Working Examples 5 and 6, which were prepared using styrene-butadiene rubber 2, which had a high weight-average molecular weight, a styrene quantity of from 30 to 50 mass % and a butadiene quantity of from 30 to 65 mass %, and silica 2, which had a CTAB adsorption specific surface area of greater than 160 $m^2/g$, were better able to suppress silica aggregation and an increase in viscosity and achieve better wet performance and rolling resistance.

REFERENCE NUMERALS

1 Bead portion
2 Side wall portion
3 Tire tread portion

4 Carcass layer
5 Bead core
6 Bead filler
7 Belt layer
8 Rim cushion

What is claimed is:

1. A rubber composition for tires, consisting of a diene rubber, non-aggregated silica, a sulfur-containing silane coupling agent and an alkyltriethoxysilane represented by formula (I) below, wherein
   50 mass % or more of the diene rubber is a styrene-butadiene copolymer rubber,
   the sulfur-containing silane coupling agent has a mercapto group,
   the content of the silica is from 5 to 150 parts by mass per 100 parts by mass of the diene rubber,
   the content of the sulfur-containing silane coupling agent is from 3 to 15 mass % relative to the content of the silica, and
   the content of the alkyltriethoxysilane is from 0.1 to 20 mass % relative to the content of the silica and has the formula;

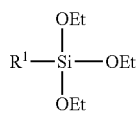

in the formula, $R^1$ is an alkyl group having 7 to 20 carbon atoms, and wherein the silica has a CTAB adsorbtion specific surface area of greater than 160 m²/g,
and
   additives selected from the group consisting of fillers excluding aggregated silica, crosslinking agents, crosslinking accelerators, zinc oxide, oils, anti-aging agents, plasticizers and mixtures thereof.

2. The rubber composition for tires according to claim 1, wherein a weight-average molecular weight of the styrene-butadiene rubber is from 900,000 to 2,000,000.

3. A pneumatic tire that uses the rubber composition according to claim 1.

4. A pneumatic tire that uses the rubber composition according to claim 2.

5. The rubber composition for tires according to claim 1, wherein the styrene-butadiene rubber contains from 30 to 50 mass % of an aromatic vinyl and has a vinyl bond content in a conjugated diene of from 30 to 65 mass %.

6. The rubber composition for tires according to claim 1, wherein the alkyl group having 7 to 20 carbon atoms is an octyl group or a nonyl group.

7. A pneumatic tire that uses the rubber composition according to claim 5.

8. A pneumatic tire that uses the rubber composition according to claim 6.

9. A rubber composition for tires according to claim 1 wherein
   60 mass % or more of the diene rubber is a styrene-butadiene copolymer rubber,
   the content of the silica is from 70 to 100 parts by mass per 100 parts by mass of the diene rubber,
   the content of the sulfur containing silane coupling agent is from 5 to 10 mass % relative to the content of the silica, and
   the content of the alkyltriethoxysilane is from 0.5 to 10 mass % relative to the content of the silica.

* * * * *